US006547325B2

(12) United States Patent
Drost et al.

(10) Patent No.: US 6,547,325 B2
(45) Date of Patent: Apr. 15, 2003

(54) CHILD PROTECTING OUTER COVER FOR INFANT CAR SEAT

(76) Inventors: Mercedes Drost, 73 Morningmist Street, Brampton, Ontario (CA), L6R 2A6; Mark A. Alli, 73 Morningmist Street, Brampton Ontario (CA), L6R 2A6

( * ) Notice: Subject to any disclaimer, the term of this patent is extended or adjusted under 35 U.S.C. 154(b) by 0 days.

(21) Appl. No.: 09/802,881

(22) Filed: Mar. 12, 2001

(65) Prior Publication Data

US 2002/0125747 A1 Sep. 12, 2002

(51) Int. Cl.$^7$ .................................................. B60N 2/28
(52) U.S. Cl. ............................ 297/184.13; 297/219.12
(58) Field of Search ........................ 297/184.13, 184.1, 297/219.12, 250.1

(56) References Cited

U.S. PATENT DOCUMENTS

| | | | |
|---|---|---|---|
| 4,478,453 A | 10/1984 | Schutz | |
| 4,891,454 A | 1/1990 | Perdelwitz, Jr. et al. | |
| 4,993,090 A | 2/1991 | Ranalli | |
| 5,243,724 A | 9/1993 | Barnes | |
| 5,437,061 A | * 8/1995 | Kenner | 297/184.13 |
| 5,781,946 A | 7/1998 | McEntire et al. | |
| 5,950,261 A | * 9/1999 | Hay et al. | 297/219.12 |
| 5,988,742 A | 11/1999 | Stevens | |
| 6,019,421 A | * 2/2000 | Roh | 297/184.13 |
| 6,056,355 A | 5/2000 | Klassen | |
| 6,145,932 A | * 11/2000 | Hamel-Nyhus et al. | 297/219.12 |
| 6,209,953 B1 | * 4/2001 | Mackay et al. | 297/184.13 |

FOREIGN PATENT DOCUMENTS

CA 2262877 6/2000

OTHER PUBLICATIONS

Web Page Printout http://www.kozykid.com/.
Web Page Printout http://www.teddytoes.com/Productsl.ivnu.
Web Page Printout http://www.lilliebugs.com/infantcarseat-cover.html.
Web Page Printout http://www.goincozy.com/.
Web Page Printout http://www.spidertel.com/lilys_jewels/product.htm.

* cited by examiner

Primary Examiner—Peter R. Brown
(74) Attorney, Agent, or Firm—Marks & Clerk

(57) ABSTRACT

A child protecting outer cover for an infant car seat covers the car seat and extends down the sides with an elasticized or drawstring bottom hem so as to be secured in place. The cover has an opening through which the face of an infant may extend, and a recloseable flap over that opening. Below the opening, there is a pair of recloseable body flaps which open right to the bottom of the infant car seat, or close up to the opening for the infant's face. When the pair of body flaps is opened, the infant can be placed into or removed from the car seat without having to take the outer cover off the car seat; and the cover may be placed over the car seat even when the car seat is secured in place on a support.

9 Claims, 4 Drawing Sheets

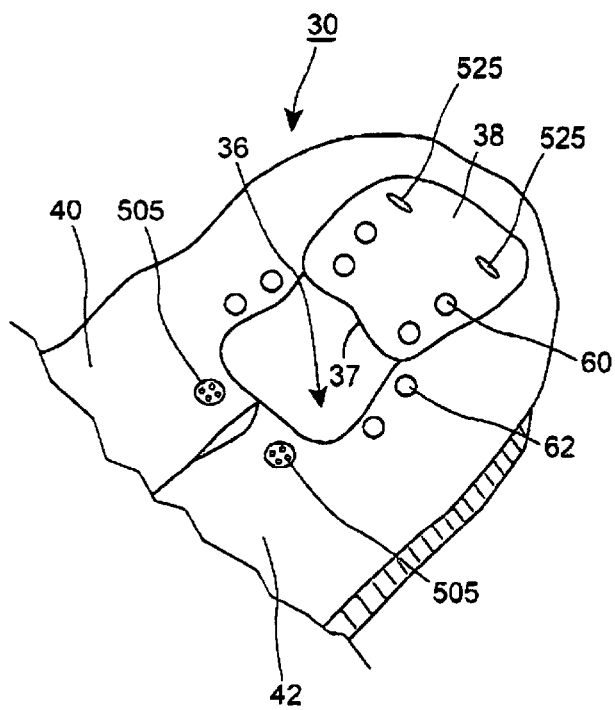
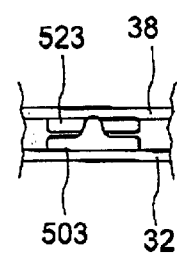
Figure 3a
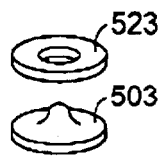
Figure 3b
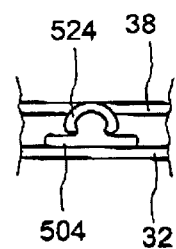
Figure 4a
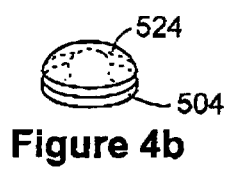
Figure 4b
Figure 5
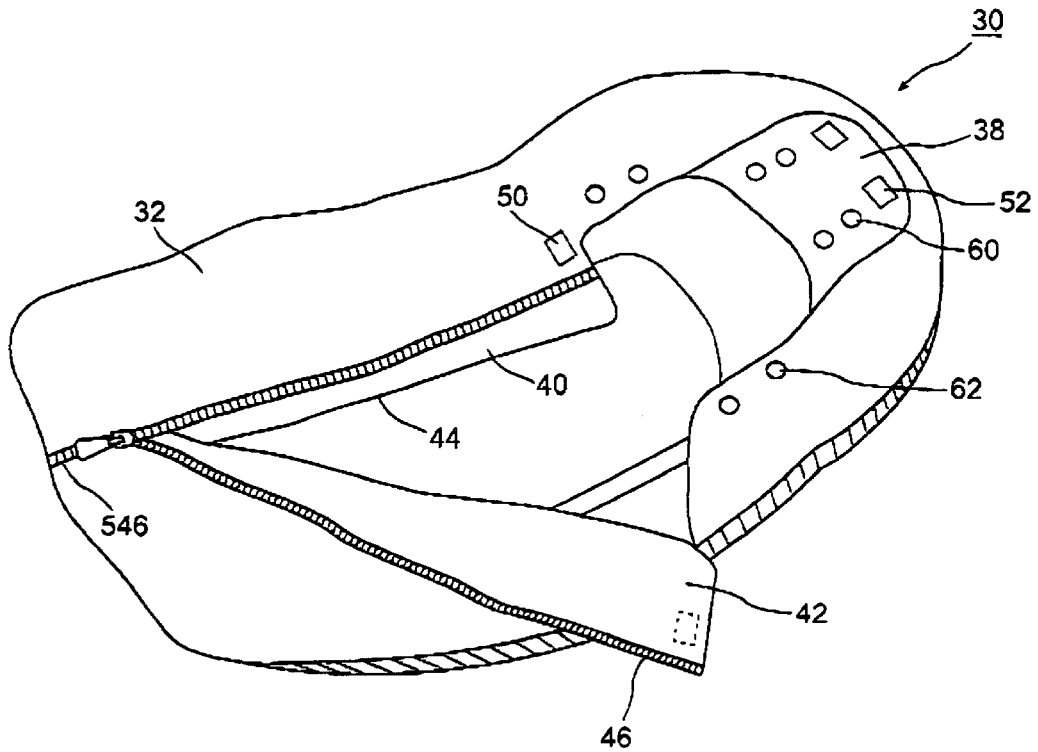
Figure 6

CHILD PROTECTING OUTER COVER FOR INFANT CAR SEAT

FIELD OF THE INVENTION

This invention relates to covers for infant car seats. In particular, the invention relates to covers which may be placed over infant car seats so as to protect an infant who has been placed in the car seat from the elements, to keep the infant warm or cozy, and to otherwise provide a protective cover over an infant. However, the present invention provides a child protecting outer cover for an infant car seat which may be placed onto the car seat while the car seat is locked in place such as in the rear seat of an automobile or an a wheeled stroller frame; and, moreover, the present invention permits an infant to be placed in the infant car seat or removed therefrom without the necessity of having to remove the cover from the infant car seat.

BACKGROUND OF THE INVENTION

Even when infants are very small, effectively ranging from neo-natal up to about six or nine or ten months, and in weight up to about 9 kilograms, the infant is generally transported in an infant car seat. Infant car seats generally have the shape of a basket, into which the infant is placed while lying on its back, and into which the infant is then secured using straps over the shoulders and through the legs in what is effectively a three-point restraining harness. Indeed, in most jurisdictions, at least in North America, when an infant is being transported in an automobile it is mandated that the infant must be carried in an infant car seat, which must itself be securely fastened in place using automobile seat belts. The direction in which the infant is placed when placed in the infant car seat in an automobile—forward- or rearward-facing—is also mandated, depending on the weight of the infant.

Sometimes, it is desired to remove the infant car seat from the automobile and carry it by a handle, or place it onto a wheeled stroller frame, when the infant is taken from the automobile. Such instances would include going to the shopping mall, visiting relatives or friends, outings to the park, and so on. In such instances, the infant car seat should be capable of being moved without disturbing the protecting cover over the infant in the infant car seat.

Moreover, when it is desired to place an infant into the infant car seat, or remove the infant therefrom, especially in instances when the infant is going to be carried from and/or to a sheltered environment—such as from the home to the garage, and vice versa—it is oftentimes desired to leave the infant car seat in place in the automobile. At the same time, it is oftentimes desired to leave the infant cover in place on the infant car seat, even though the infant is to be placed into or removed from the infant car seat.

Still further, it is desirable to open or close at least that portion of the cover which is over the body of the infant, in the event that it is felt that the infant is getting too warm, or to close up the cover over the body of the infant if it is felt that additional warmth and protection is needed. At the same time, depending on the weight of the fabric from which the cover is made, it is possible to provide sufficient warmth for the infant without the necessity of additional blankets and the like, which may weigh heavily against the infant.

On the other hand, it is often felt that at least the face of the infant should be left open for ease of breathing and the like, so an opening is provided for the face of the infant. However, this sometimes leads to a requirement to cover the face of the infant when the infant is being carried outside—such as when the infant car seat has been removed from an automobile in order to carry the infant into a shopping mall, a doctor's office, and so on. That, in turn, leads to the necessity for making a provision to protect the face of the infant while, at the same time, permitting adequate freedom to the infant's face for breathing.

Above all, there is a long-standing requirement for the provision of a protective outer cover for an infant car seat which permits the cover to be put into place over the infant car seat when the car seat is secured in place on a support surface, and more particularly which permits an infant to be placed into or removed from an infant car seat without the necessity of first having to remove the protective outer cover away from the infant car seat.

The inventor herein has unexpectedly discovered that it is possible to meet those requirements by providing a child protecting outer cover for an infant car seat where the cover is constructed such that there is a pair of recloseable body flaps that are formed in the region which covers the body of the infant, and which are openable to the bottom or foot end of the infant car seat while the cover is otherwise secured in place on the infant car seat.

DESCRIPTION OF THE PRIOR ART

Several patents, and websites selling infant car seat covers, are noted below, with some discussion concerning the product which is described in the noted references.

SCHUTZ U.S. Pat. No. 4,478,453 issued Oct. 23, 1984, teaches an adjustable cover for an infant car seat. In this case, however, the car seat is one which is typically of the sort which is used to transport infants who are at least 9 or 10 kilograms in weight, and who are capable of sitting more or less upright—as opposed to an infant car seat which is particularly of the sort intended for transporting infants who are placed therein on their backs, and who weigh less than 9 kilograms. Further, the infant cover is one which is intended to fit into the car seat and has a plurality of openings formed in it through which restraining straps of the car seat will extend. Moreover, the adjustable cover is one which is intended to be a cover for the seat, and the child is placed over the cover, rather the being a cover which is placed over an infant when the infant is in the infant car seat.

PERDELWITZ, Jr. et al. U.S. Pat. No. 4,891,454 issued Jan. 2, 1990, also teach an infant car seat liner which is of the sort which may fit into a variety of different kinds of infant carriers, but so as to line the car seat. The infant seat liner is disposable, since it may be soiled by the infant when in use, because the infant is placed over or on top of the seat liner, rather than being placed over the infant as a cover.

RANALLI U.S. Pat. No. 4,993,090 issued Feb. 19, 1991, teaches a baby blanket which is intended also to line a car seat which is fitted with a harness. Once again, the blanket has a plurality of apertures through which the restraining members of the harness are passed to be fastened around the child, after which the blanket is wrapped around the child and the harness.

BARNES U.S. Pat. No. 5,243,724 issued Sep. 14, 1993, teaches a multi-purpose baby wrap which may be a blanket, a bunting, a pad, or a carrier sling. There are two major parts, a full sized baby blanket, and a large bifurcated pocket which attaches to it. The wrap may be used as a liner in an infant car seat, or in a stroller.

A similar multi-purpose wrap is taught in McENTIRE et al. U.S. Pat. No. 5,781,946 which issued Jul. 21, 1998. Once again, the infant may be placed over the wrap, the restraints put into place, and then the wrap is tucked around the infant.

Yet another wrap for use in both an infant swing and an infant carrier is that taught in STEVENS U.S. Pat. No. 5,988,742 which issued Nov. 23, 1999. This cover has a top sheet and a bottom sheet which are formed by folding a single continuous sheet, the top and bottom sheets being removably connected one to another by snaps or by a zipper. An adjustable flap defines an opening for the head of the infant, when the infant is wrapped into the cover.

KLASSEN U.S. Pat. No. 6,056,355 issued May 2, 2000 (and in cognate published Canadian patent application No. 2,226,877, laid open Jun. 21, 2000), teaches a cover for an infant car seat, where the cover has an elasticized opening at its bottom so that it may be placed over and secured around the infant car seat without disengaging the safety belts of the seat. An opening is provided in the top of the cover, which allows only the upper portion of the body of the infant to be accessed or exposed. This opening for the face of the infant has a flap which may be placed over the face of the infant when necessary, and a mesh is provided so as to allow air circulation and ventilation to be provided to the infant for breathing and for cooling. However, in order to place the infant into the infant car seat, or remove the infant therefrom, it is first necessary to remove the cover away from the infant car seat.

The following websites were available as at the filing date of the present application, and describe products which were then currently available:

Kozy Kid Inc. offered an infant carrier cover at www.kozykid.com, which cover had a long zipper to permit access to an infant, but without any specific opening near the face of the infant.

TEDDY TOPPER™ infant carrier cover was shown at www.teddytoes.com, having an opening for the face of the infant which is shielded by a standup collar, and a drop front which comprises a large flap that is double snapped to the cover to allow access to the baby without removing the cover. There is no flap which covers the face of the infant.

A further baby seat cover is found at www.lilliebugs.com, which comprises only a flap in the head area of the infant, so that the cover can be kept on the car seat for the duration of the outings during which the infant is being transported in the car seat. However, the cover must be removed from the car seat before the infant can be removed.

Another cover having an opening only for the face of the infant is found at www.goincozy.com.

Finally, a further cover which has only an opening for the face of the infant is found at www.spidertel.com/lilysjewels/product.htm.

SUMMARY OF THE INVENTION

In accordance with one aspect of the present invention, there is provided a child protecting outer cover for an infant car seat which comprises a blanket-like cover adapted for placement over an infant car seat. The cover has at least a major portion thereof which is made from a flexible fabric material. The protecting outer cover has a protecting dome-like configuration so that it may be placed over the top of an infant car seat and so as to extend downwardly at a bottom edge of the cover so as to overlie at least a portion of the sides of an infant car seat when in place thereon.

The cover has an opening formed therein, in a region where the face of an infant would be located when an infant is placed in an infant car seat and the cover is in place on the infant car seat.

There is a recloseable face flap which is located on the cover at an edge of the opening, so as to be placed over and folded away from the face of an infant when an infant is placed in the infant car seat and the cover is in place over the infant car seat.

The cover also has a pair of recloseable body flaps formed in the region thereof which is below the opening for the face. Each body flap has an edge which extends from the opening to the foot of the infant car seat when the cover is in place on the car seat.

The body flap edges are arranged so as to be at least adjacent to each other when the body flaps are closed so as to provide coverage of the infant car seat and the body of an infant therein when the recloseable body flaps are closed and the cover is in place on an infant car seat.

First and second fastening means are provided to maintain the face flap in a closed condition covering the face of an infant, or in an open condition away from the face of an infant, when an infant is placed in an infant car seat and the cover is in place on the infant car seat.

Third fastening means are provided to maintain the pair of recloseable body flaps in a closed condition.

There are securement means provided at the bottom edge of the cover so as to secure it in place over an infant car seat.

Also, there is at least one air passage formed through at least one of the recloseable face flap and the cover in a region adjacent the opening for the face.

Thus, the cover may be put into place over an infant car seat when the car seat is secured into place on a support surface therefor.

Also, an infant may be placed into or removed from an infant car seat when the cover is in place thereon, without having to remove the cover away from the infant car seat.

An aspect of the present invention provides that each of the first and second fastening means may be chosen from the group which consists of hook and loop fasteners, dome fasteners, snap fasteners, and buttons. Likewise, the third fastening means may also be chosen from the same group of fasteners, or it may be a zipper.

The flexible fabric from which a major portion of the cover may be made is chosen from the group which consists of cotton, quilted cotton, flannel, quilted flannel, nylon, quilted nylon, synthetic fabrics, wool, and mixtures thereof.

When the recloseable face flap is formed integrally with the cover, then it is made from the same fabric material as the cover.

Alternatively, when the recloseable face flap is made separately from the cover, and is physically attached thereto such as by being sewn thereto, it may be formed from the same kind of fabric as noted above, or it may be a mesh or a translucent flexible plastic sheeting.

When the third fastening means between the recloseable body flaps is a zipper, then the edges of the body flap lie adjacent each other when in a closed condition. However, when the third fastening means comprises at least one hook and loop fastener—or, for that matter, at least one dome fastener, snap fastener, or button—then the body flap edges lie with one body flap edge overlying the other body flap edge when in a closed condition.

The securement means at the bottom edge of the cover may be chosen from the group which consists of an elasticized hem, a drawstring hem, at least a pair of ties adapted to extend under an infant car seat, at least a pair of elasticized loops adapted to extend under an infant car seat, and mixtures thereof.

BRIEF DESCRIPTION OF THE DRAWINGS

The novel features which are believed to be characteristic of the present invention, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only and are not intended as a definition of the limits of the invention. Embodiments of this invention will now be described by way of example in association with the accompanying drawings in which:

FIG. 3a is an exploded side view of a snap fastener of the child protecting outer cover for an infant car seat in keeping with the present invention;

FIG. 3b is an exploded perspective view of a snap fastener for the child protecting outer cover for an infant car seat in keeping with the present invention;

FIG. 4a is an exploded side view of a dome fastener of the child protecting outer cover for an infant car seat in keeping with the present invention, FIG. 4b is an exploded perspective view of a dome fastener for the child protecting outer cover for an infant car seat in keeping with the present invention;

FIG. 5 is a perspective view of a portion of the child protecting outer cover in the region of the reclosable face flap in keeping with the present invention, where button fasteners are FIG. 6 is a perspective view of a child protecting outer cover for an infant car seat in keeping with the present invention, where the third fastening means is a zipper, and the body flaps are shown in an open condition;

DETAILED DESCRIPTION OF THE PREFERRED EMBODIMENTS

The novel features which are believed to be characteristic of the present invention, as to its structure, organization, use and method of operation, together with further objectives and advantages thereof, will be better understood from the following discussion.

Figure 1:
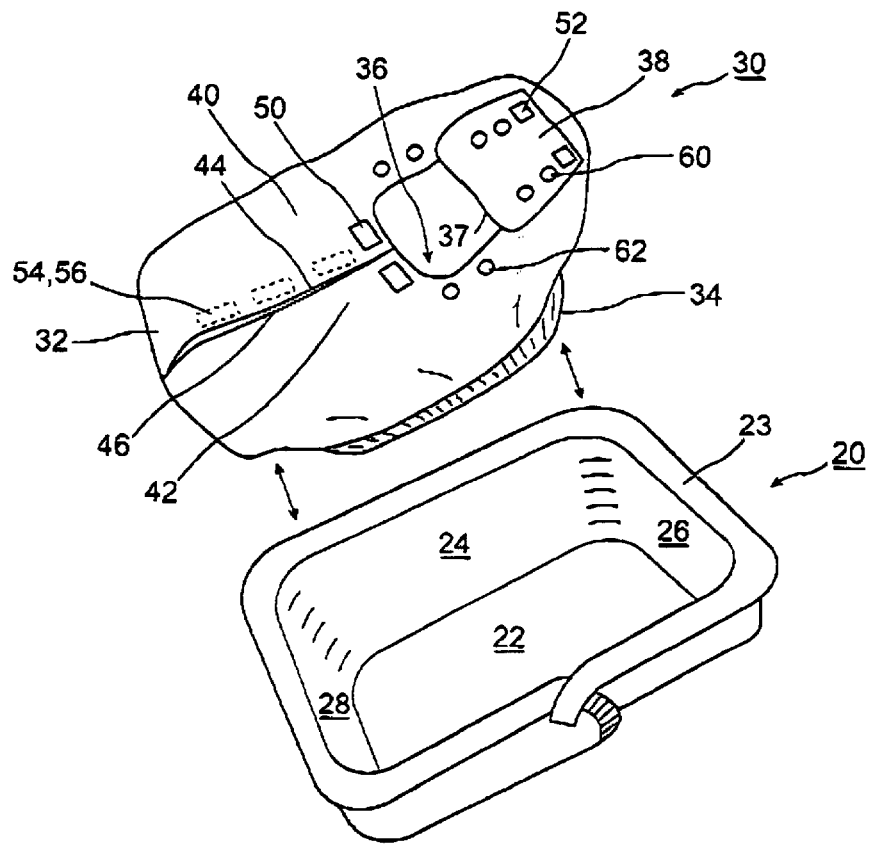
FIG. 1 is a view showing a child protecting outer cover for an infant car seat being removed away from the infant car seat.
Figure 2:
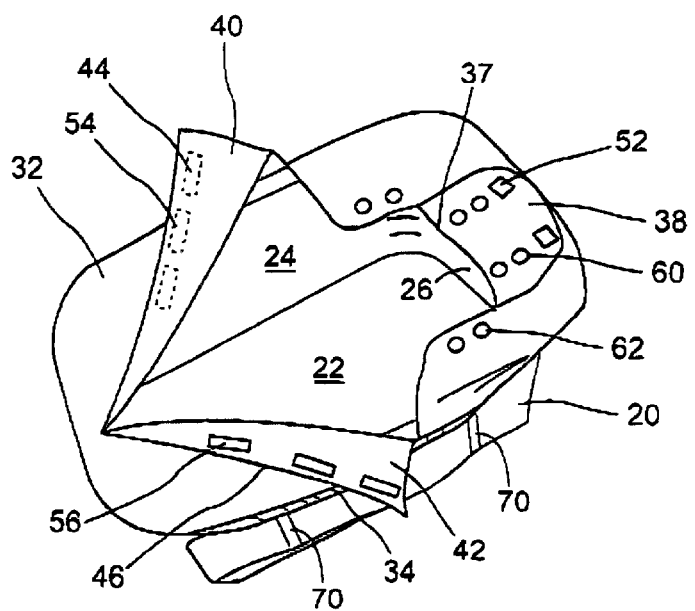
FIG. 2 shows a child protecting outer cover for an infant car seat in place on the infant car seat.

An infant car seat is shown in each of FIGS. 1 and 2 at 20. Typically, an infant car seat has an appearance more or less like that of a basket, and it may have a handle secured at the sides, which handle is capable of being placed in an upright position or in a collapsed position. The handle is not shown for purposes of clarity; but it will be understood that the child protecting outer cover of the present invention fits over the infant car seat 20 in such a manner so as not to interfere with the operation of the handle.

The infant car seat has a bottom 22, sides 24, a head end 26, and a foot end 28. Child restraining straps are in the infant car seat 20, but are not shown—again, for purposes of clarity. The child restraint straps are adapted to fit over the shoulders of the infant, and between the legs of the infant, with adjustable tightening means to ensure a snug and secure fitment against the infant.

Typically, the infant may be clothed in anything ranging from a light sleeper up to a bunting or snowsuit, depending on the temperature. However, infants tend to be quite warm, and because of their low body mass and their inability to communicate, it is incumbent upon the parent or guardian to ensure that the infant is neither too cold nor too warm, by properly dressing the infant and adjusting additional cover or blanket over the infant.

This gives rise to several difficulties, especially when the infant is to be transported from one place to another, usually in the rear seat of an automobile—as mandated by law—or sometimes by being in an infant car seat which is placed into a wheeled frame so as to function as a stroller. Especially when an infant is to be carried from the home to a remote location via automobile, the infant may be carried from a warm environment to a cool or cold environment (from inside to outside) and thence to a cool environment (the backseat of an automobile) and afterwards to a prospectively warm environment (such as a shopping mall, or to visit friends or relatives, the doctor, and so on). In many such instances, it is convenient to the parent or guardian not to carry the infant car seat from say, the home to the automobile, or from the automobile to the place being visited, as the infant can be carried in the arms, a sling or front papoose, and so on.

In such instances, it is common to leave the infant car seat in the automobile, securely attached by the car seat belts, in the manner which is well known. However, it has heretofore been very inconvenient to place the infant into the infant car seat or to remove the infant therefrom without first having to disassociate a protective outer cover from the infant car seat. This tends to be very inconvenient; and the present inventor has discovered that it is quite possible to overcome that inconvenience by the proper construction and design of a child protecting outer cover for an infant car seat.

It should be stated, of course, that the child protecting outer cover may be lightweight or heavyweight so as to protect the child from extreme cold weather or from the sun in hot climates; and, of course, it is constructed of materials which will shed rain or snow, and protect the infant from those elements, as well as from wind.

To that end, the present invention provides a child protecting outer cover 30 which is intended to be placed over an infant car seat, so as to provide a blanket-like cover therefor. Most infant car seats have approximately the same dimensions, but they are not exactly the same size as to length, width, or depth. Also, the size of the infant, and its bulkiness—depending on the type and amount of clothing that it may be wearing, as well as any protective pads that are placed beneath the infant, will affect the height of the infant's body and face above the bottom surface 22 of the infant car seat 20. For all of those reasons, as well as for additional reasons of opening and closing the child protecting outer cover as discussed hereafter, the blanket-like cover is made such that at least a major portion thereof, generally identified at 32, is made from a flexible fabric material. As can be seen in each of FIGS. 1 and 2, the general configuration of the child protecting outer cover 30 is such that it has a dome-like appearance. This permits the child protecting outer cover to be placed over an infant car seat 20, and to extend downwardly at the bottom edges 34 thereof, so as to overlie at least a portion of the sides 24 of the infant car seat 20 when the child protecting outer cover 30 is in place on the infant car seat 20.

Because most infant car seats have a rim 23, over which the bottom edge 34 of the child protecting outer cover must pass as it is being put into place on the infant car seat 20, it is important for the structure of the child protecting outer cover 30 to be such that it can be put into place and removed from the infant car seat when necessary—such as for cleaning or for replacement with another child protecting outer cover 30 due to seasonal changes or inclemency of weather, and so on.

The child protecting outer cover 30 has an opening 36 formed therein, in a region where the face of an infant will be located. This permits the face of the infant to be seen and accessed, such as for feeding the infant or placing a soother into the mouth of the infant, and if the infant is awake it also permits the infant to observes its surroundings.

However, particularly in instances where the infant is to be placed or carried out of doors in inclement or very cold weather, it is convenient to provide a recloseable face flap 38 which is located on the child protecting outer cover 30 at an edge of the opening 36. Typically, the recloseable face flap 38 is located at the top edge 37 of the opening 36 so that the recloseable face flap 38 may be folded away from the face of an infant as is shown in FIGS. 1 and 2, or placed over the face of an infant when necessary.

An important feature of the present invention is that the child protecting outer cover 30 also comprises a pair of recloseable body flaps 40, 42 which are formed in the region of the child protecting outer cover 30 which is below the opening 36—that is, in the region of the child protecting outer cover 30 which is anatomically below the face of the infant, and is therefore in the region of the child protecting outer cover 30 which cover the body of an infant. Each body flap 40, 42 has an edge 44, 46 respectively, which are such that when the body flaps 40, 42 are closed, coverage of the infant car seat and the body of an infant placed therein is achieved. This arrangement is particularly clear in inspection of FIGS. 1 and 2. FIG. 1 showing the recloseable body flaps 40, 42 in a closed condition and FIG. 2 shows them in an open position.

First fastening means 50, 52 are provided so as to maintain the recloseable face flap 38 in a closed condition covering the face of an infant. Second fastening means (not shown) are provided so as to maintain the recloseable face flap 38 in an open position—as shown in each of FIGS. 1 and 2—so as to expose the face of an infant and so as to provide access thereto.

Third fastening means 54, 56 are provided to maintain the pair of recloseable body flaps 40, 42 in a closed condition, as shown in FIG. 1.

Securement means are provided at the bottom edge 34 of the child protecting outer cover 30, so as to secure the child protecting outer cover in place over an infant car seat 20.

At least one air passage 60 or 62 is formed through at least one of the recloseable face flap 38 and the fabric 32 of the child protecting outer cover 30 at a region adjacent the opening 36. This provides an appropriate means for passage of air to the infant as it breathes, in the event that it is required to close the recloseable face flap 38 due to extreme cold or inclemency of weather.

From the above description, it will be quite evident that the child protecting outer cover 30 may be put into place over an infant car seat 20, whether or not the infant car seat 20 is secured in place on a support surface such as the rear seat of an automobile, a stroller frame, or even a floor or table as the infant and infant car seat are being readied for a journey. It is particularly evident that the infant car seat 20 may, indeed, be put into and be kept in place such as in the rear seat of an automobile, and the child protecting outer cover 30 may be put over the infant car seat 20 without disturbing the securement fittings for the infant car seat on its support surface. Moreover, it is evident that the infant car seat 20 may be moved to or from its support surface, and particularly that it may be secured in place or removed from its secure placement on such as the rear seat of an automobile, without disturbing the placement of the child protecting outer cover 30 over the infant car seat 20.

More particularly, it is evident from the above discussion that, unlike car seat covers heretofore known, it is now possible to place an infant into an infant car seat 20, or remove the infant therefrom, with the child protecting outer cover 30 in place on the infant car seat 20, and without having to remove the child protecting outer cover 30 away from the infant car seat 20. This arrangement is possible particularly because of the provision of the recloseable body flaps 40, 42, as well as the placement of the opening 36.

Typically, the first and second fastening means 50, 52, and as discussed above with respect to maintaining the recloseable face flap 38 in an open condition, are hook and loop fasteners (FIG. 2). However, they may also be dome fasteners 504 and 524 (FIGS. 4a and 4b) or snap fasteners 503 and 523 (FIGS. 3a and 3b), or buttons 505 and 525 (FIG. 5).

Likewise, the third fastening means 54, 56 which is use to close he recloseable body flaps 40, 42, may also be hook and loop fasteners, as shown in FIG. 2, snap fasteners 503 and 523 (FIGS. 3a and 3b), dome fasteners 504 and 524 (FIGS. 4a and 4b), or buttons, similar to the button and button hole configuration shown in FIG. 5; and, as well, zippers 546 (FIGS. 6 and 7) are an appropriate fastening means to be employed.

However, for ease of operation, opening and closing, and because they will operate without exact placement of one co-operating element of a fastening means with respect to the other, typically, hook and loop fasteners are employed.

Depending on the weather conditions, both as to temperature and as to the presence and nature of precipitation, the material of the at least major portion of the child protecting outer cover 30 which is fabric may change from time to time. Typically, for cold weather conditions, quilted cotton, flannel, or nylon may be employed. Otherwise, cotton, flannel, or nylon, synthetic fabrics, wool, and mixtures thereof, may be employed as the flexible fabric to be used. Typically, such fabrics are decorated with baby motifs of the sort which may appeal to parents or grandparents, or which advise of the sex of the infant, and so on. The fabrics may be treated so as to be water and snow repellent, wind resistant, and the like.

When the recloseable face flap 38 is formed integrally with the child protecting outer cover, by suitable patternmaking, cutting and sewing, and the like, it would be formed of the same material. Otherwise, the recloseable face flap may be formed as well of a material such as mesh or translucent flexible plastics sheeting. Such other materials may provide a view of the face of the infant, and when the infant is awake it may permit the infant to observe its surroundings. Also, if the mesh is silicon coated and/or has a tight enough weave, it will be water repellent at least for a lightly falling rain or snow.

Figure 7:
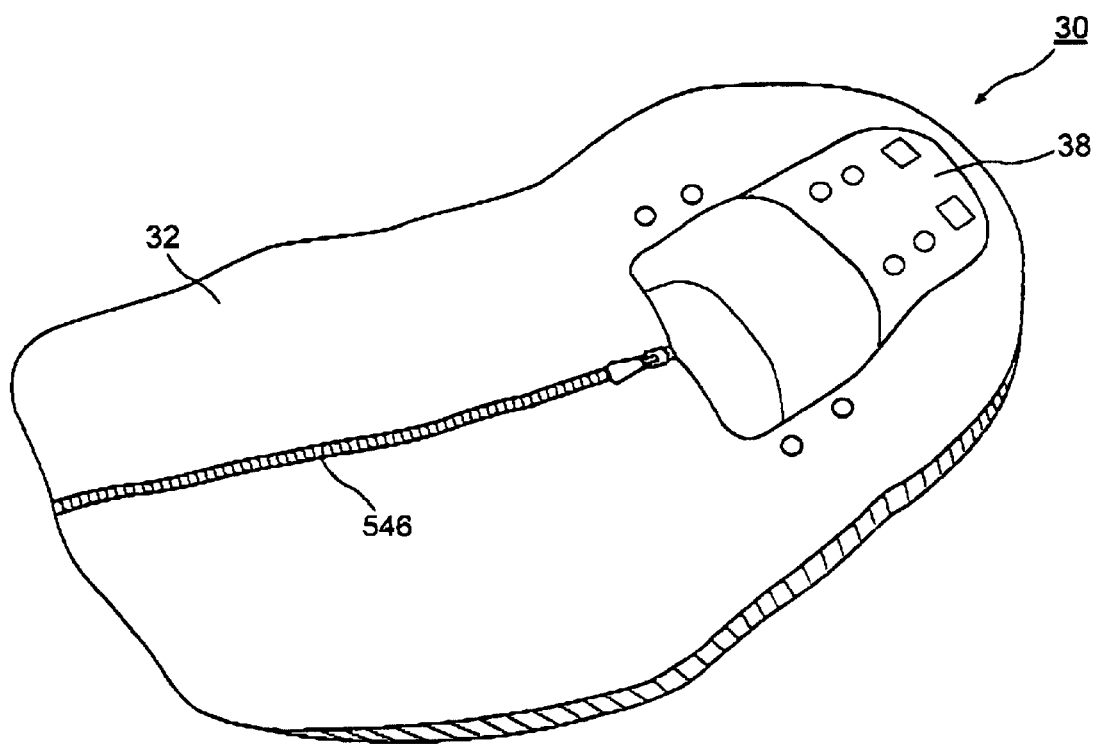
FIG. 7 is a perspective view of a child protecting outer cover for an infant car seat in keeping with the present invention, where the third fastening means is a zipper, and the body flaps are shown in a closed condition.

When the fastening means 54, 56 is such as a zipper 546, then the edges 44, 46 of the recloseable body flaps 40, 42 will lie adjacent each other when the recloseable body flaps 40, 42 are in a closed condition (FIG. 7).

Otherwise, when the fastening means 54, 56 are such as hook and loop fasteners, or other kinds of fasteners as described above, then one of the recloseable body flaps 40 or 42 will overlie the other recloseable body flap 40 or 42 at their respective edges 44, 46, when they are in a closed condition.

Figure 8:
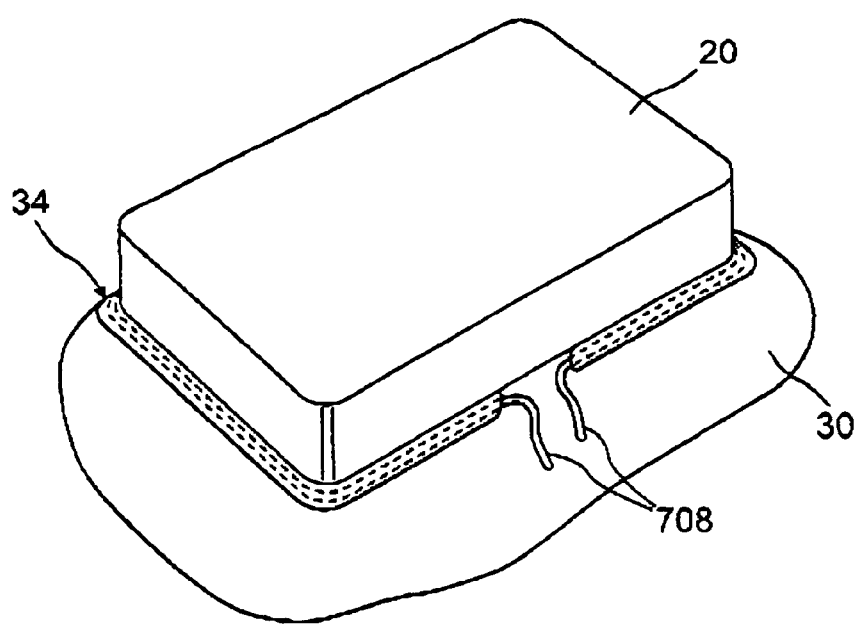
FIG. 8 is a perspective bottom view of a child protecting outer cover for an infant car seat in place on the infant car seat, where the securement means at the bottom edges of the child protecting outer cover is a drawstring herm.

The securement means by which the bottom edge 34 of the child protecting outer cover may be secured in place against the infant car seat 20 as shown in FIG. 2, are typically arranged by the provision of an elasticized hem. However, the bottom edge 34 of the dome-like configuration of the child protecting outer cover 30 may also be constructed with such as a draw string hem 708 (FIG. 8).

Figure 10:
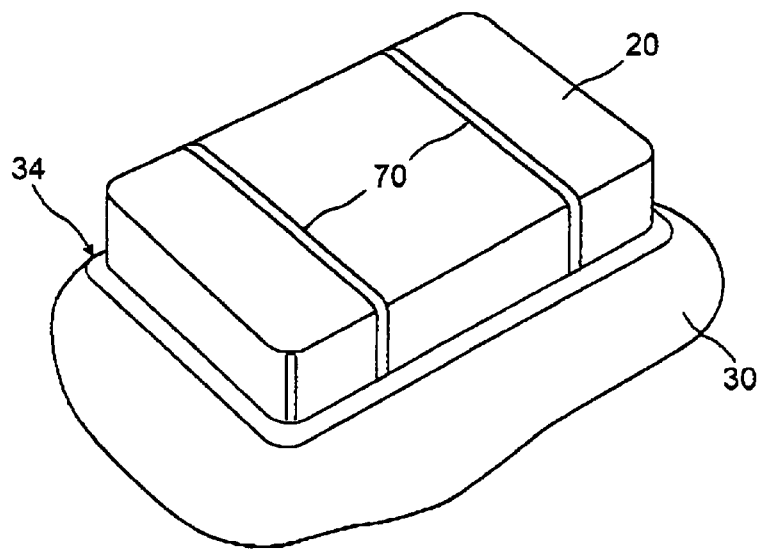
FIG. 10 is a perspective bottom view of a child protecting outer cover for an infant car seat in place on the infant car seat, where the securement means at the bottom edges has at least a pair of elasticized loops adapted to extend under an infant car seat.
Figure 9:
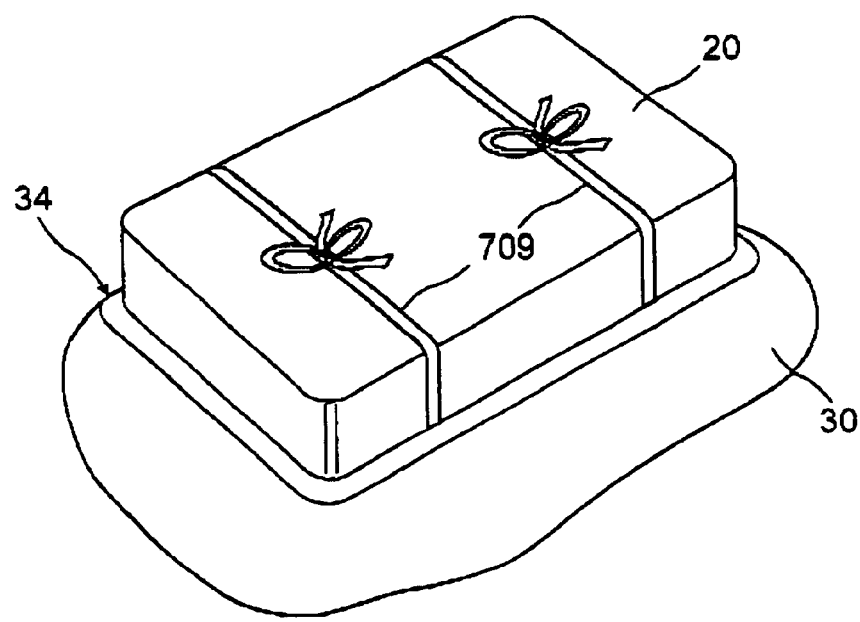
FIG. 9 is a perspective bottom view of a child protecting outer cover for an infant car seat in place on the infant car seat, where the securement means at the bottom edges has at least a pair of ties adapted to extend under an infant car seat.

Still further, the securement means at the bottom edge 34 of the child protecting outer cover 30 may comprise a pair of ties 709 (FIG. 9) which are adapted to extend under the infant car seat 20, or a pair of elasticized loops which are adapted to extend under the infant car seat 20, as shown at 70 in FIG. 2 and FIG. 10.

There has been described a child protecting outer cover for use with an infant car seat which is such that it may be fitted to the infant car seat in such a manner as not to interfere with the placement and securement of the infant car seat on a support surface such as the rear seat of an automobile. At the same time, the child protecting outer cover is constructed in such a manner that when it is in place on an infant car seat, and infant may be placed into or removed from the infant car seat without having first to remove the child protecting outer cover from the infant car seat.

Other variations and modifications of the child protecting outer cover of the present invention, other than those described above, will be evident to those skilled in the art, without departing from the spirit and scope of the accompanying claims.

Throughout this specification and the claims which follow, unless the context requires otherwise, the word "comprise", and variations such as "comprises" or "comprising", will be understood to imply the inclusion of a stated integer or step or group of integers or steps but not to the exclusion of any other integer or step or group of integers or steps.

What is claimed is:

1. A child protecting outer cover for an infant car seat comprising a blanket-like cover adapted for placement over an infant car seat, said cover having at least a major portion thereof made from a flexible fabric material, and having a dome-like configuration so as to be placed over the top of an infant car seat and to extend downwardly at a bottom edge of said cover so as to overlie at least a portion of the sides of an infant car seat when in place thereon;

said cover having an opening formed therein in a region thereof where the face of an infant will be located when an infant is placed in an infant car seat and said cover is in place thereon;

a recloseable face flap located on said cover at an edge of said opening so as to be placed over and folded away from the face of an infant when an infant is placed in an infant car seat and said cover is in place thereon;

said cover having a pair of recloseable body flaps formed in the region thereof below said opening, each body flap having an edge which extends from said opening to the foot of an infant car seat when in place thereon;

said body flap edges being arranged so as to at least be adjacent each other when said body flaps are closed so as to provide coverage of an infant car seat and the body of an infant therein when said pair of recloseable body flaps are closed and said cover is in place on an infant car seat;

first and second fastening means to maintain said face flap in a closed condition covering the face of an infant, and an open condition away from the face of an infant, respectively, when an infant is placed in an infant car seat and said cover is in place thereon:

third fastening means to maintain said pair of recloseable body flaps in a closed condition;

securement means at said bottom edge of said cover so as to secure said cover in place over an infant car seat; and at least one air passage formed through at least one of said recloseable face flap and said cover in a region adjacent said opening;

whereby said cover may be put into place over an infant car seat when the car seat is secured in place on a support surface therefor; and whereby an infant may be placed into or removed from an infant car seat when said cover is in place thereon, without having to remove said cover away from the infant car seat.

2. The child protecting outer cover for an infant car seat, as claimed in claim 1, wherein each of said first and second fastening means is chosen from the group consisting of hook and loop fasteners, dome fasteners, snap fasteners, and buttons.

3. The child protecting outer cover for an infant car seat, as claimed in claim 1 wherein said third fastening means is chosen from the group consisting of zippers, hook and loop fasteners, dome fasteners, snap fasteners, and buttons.

4. The child protecting outer cover for an infant car seat, as claimed in claim 1 wherein said flexible fabric is chosen from the group consisting of cotton, quilted cotton, flannel, quilted flannel, nylon, quilted nylon, synthetic fabrics, wool, and mixtures thereof.

5. The child protecting outer cover for an infant car seat, as claimed in claim 1 wherein said recloseable face flap is formed integrally with said cover of the same flexible fabric as said cover.

6. The child protecting outer cover for an infant car seat, as claimed in claim 1, wherein said recloseable face flap is formed of a fabric chosen from the group consisting of mesh, translucent flexible plastic sheeting, cotton, quilted cotton, flannel, quilted flannel, nylon, quilted nylon, synthetic fabrics, wool, and mixtures thereof.

7. The child protecting outer cover for an infant car seat, as claimed in claim 1, wherein said third fastening means is a zipper, and said body flap edges lie adjacent each other when in a closed condition.

8. The child protecting outer cover for an infant car seat, as claimed in claim 1 wherein said third fastening means comprises at least one hook and loop fastener, and said body flap edges lie with one body flap edge overlying the other body flap edge when in a closed condition.

9. The child protecting outer cover for an infant car seat, as claimed in claim 1, wherein said securement means at said bottom edge is chosen from the group consisting of an elasticized hem, a drawstring hem, at least a pair of ties adapted to extend under an infant car seat, at least a pair of elasticized loops adapted to extend under an infant car seat, and mixtures thereof.

* * * * *